Patented May 31, 1932

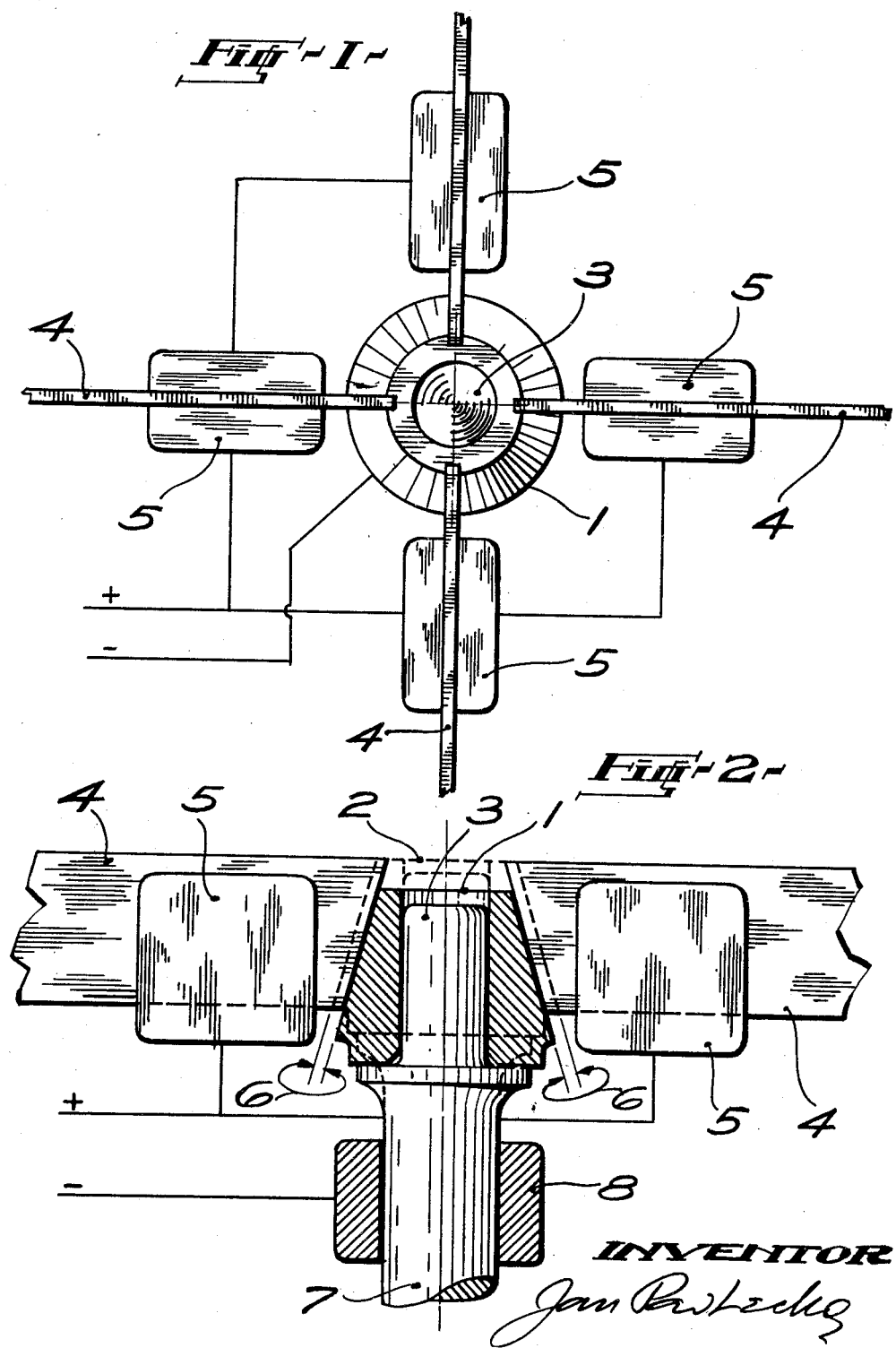

1,861,025

UNITED STATES PATENT OFFICE

JAN PAVLECKA, OF WYANDOTTE, MICHIGAN

MANUFACTURE OF FANS

Application filed August 25, 1928. Serial No. 301,964.

My invention relates more particularly to a novel and advanced method of producing rotary fans, screws, propellers, impellers, and wheels with blades or spokes in general, in quantities.

The common structural characteristic of all fans, wheels and the like, to which the present invention refers, is that they comprise essentially a hub and a plurality of blades or spokes laterally attached thereto. Because of the different functions that these members perform, they are entirely dissimilar in character, the hub generally being a concentrated mass of metal while in the blades or spokes the material is distributed thinly over a large area. In this inherent diversity of the fan or wheel structure resides the difficult problem of its manufacture; it is practically impossible, with the existing methods, to produce a fan, and the like, which would not lack at least one of the three most desirable properties, i. e., high efficiency and sufficient rigidity combined with low cost.

The object of my invention is to present a solution of the manufacturing problem outlined hereinbefore, and furthermore, to provide means through which a fan, and the like, can be made a rigid unit, incorporating a hub and blades ideally proportioned to the stresses therein and shaped for maximum efficiency, without excessive cost.

Another object of this invention is to produce a one-piece fan, and the like, out of separate parts or out of divers materials best suited for the function performed thereby.

A further object is to provide a method whereby fans, wheels and the like, can be made in quantities at a rapid rate and with the least waste of material.

The method affording all of the objects cited hereinabove will be described first in its general procedure, and then in detail in its preferred form as illustrated in the drawings affixed to this specification and forming an essential part thereof.

The problem of manufacturing a fan, and the like, of the most desirable characteristics, is resolved, through this invention, into forming the component members thereof separately from each other, and then effecting a secure juncture therebetween, as by incandescent fusion of metal, in a particular and peculiar manner disclosed hereinafter.

The hub and the blades are formed first through any suitable processes, of metallic materials, and are completed in shape and finish as members of a fan unit. In making the hub and the blades separately, it is possible to embody in them the special features that distinguish them as functionally divers though structurally integral elements of a unit. The process of fusing the individual finished members together is best accomplished through any one of the practical methods of electric incandescence welding, such as flash- or butt-welding, which involves substantially bringing the said blades fully or very nearly in contact with the said hub, introducing a heavy electric current thereinbetween, whereby the opposite contact surfaces are brought to incandescence through resistance or through arc heat, and are readily fused together under mechanical pressure.

In order to adapt the method of producing fans, and the like, as disclosed hereinabove, to manufacturing purposes in the most effective way and for the most positive results, I have conceived certain characteristics to be embodied both in the semi-finished product and in the procedure itself, and I present them as the preferred form of carrying out my invention.

It will be recognized as highly advantageous, for many reasons, that the fusing of the fan parts into a unit is accomplished preferably in unison for several or for all of them, as my invention provides. To this end, and in order that it may be conjoined with the blades readily and securely, the hub is formed with a periphery adapted as the abutting base for the blades, and for purposes of this invention, is distinguished primarily by its taperingly reduced diameter along said abutting portion thereon. In character, the periphery may be either plainly circular and smooth all over, or it may preferably be provided with a number of equidistant ridges as bases for the blades.

The blades are either stampings or forgings formed, at the roots thereof, in such a manner as to accurately conform to the tapered periphery contour of the hub to which they pertain. A small amount of additional stock is provided at the roots of the blades by making them slightly longer than the diameter of the complete fan calls for.

The process of fusing the separately finished hub and blades into a unit comprises first, arranging all or at least two of the blades radially and angularly in the exact relation to each other as in the finished product. For this purpose a number of metallic clamps are provided which grip the blades firmly and hold them stationary throughout the whole fusing operation. The hub is positioned centrally to the blades on a metallic mandrel which is adapted for axial travel. Now because of the aforementioned extra material at the roots of the blades narrowing the space thereinbetween, the hub will not fit readily into its ultimate position with respect to said blades, but will be axially displaced therefrom by a small distance depending upon the amount of taper in the contact surfaces thereof with said blades. Electric current of one polarity is introduced into all of the blades through the clamps holding them while the hub on the mandrel constitutes the other polarity. The current turned on, the intense heat developed in said contact surfaces causes fusion of metal, and as the hub is being wedged by force feed axially in between the roots of the blades the burned excess metal is squeezed out from the said contact surfaces, thereby effecting a thorough merger of the blades with the hub periphery. When the hub reaches its ultimate position between the blades, which requires only a very brief time, the current is turned off, and the fused joints are allowed to solidify.

The complete fan, screw, propeller or wheel is then removed by releasing the clamps on the blades and stripping the hub off the mandrel.

The procedure described hereinabove will presently be treated with reference to the illustrations so as to bring out more clearly the outstanding phases of the process of this invention. Fig. 1 represents a set-up for the process of fusing the blades to the hub; Fig. 2 is a side view of the same set-up in partial cross-section showing especially the hub and the blades, and the relation of the two before and after the fusing operation. The like figures in the two views denote like objects.

The hub 1, secured on the mandrel 3, Fig. 2, is characterized by a peripheral contact contour which tapers axially for the length of the blades therealong in the finished fan. The taper may of course be uniform, or along a curve, without in any way affecting the principle. The steepness of the taper has to be only such as to allow for a short travel of the hub from its initial position 1 to its ultimate position 2, shown in dotted lines in Fig. 2, and to effectively displace the molten metal from the contact surfaces in assuming said final position.

The essential characteristic of the blades or spokes 4 for the purposes and ends of this invention resides in that at their root extremity they possess an excess stock 6, which will be melted away in the process of fusing. Furthermore, the extension 6 is fashioned with a contact surface which is substantially flat, transversely at approximately right angles to the plane of the blade, and longitudinally is inclined or slanted at an angle corresponding to that of the abutting periphery contour of the hub 1, whereby in the welding set-up the root of said blades will show perfect metallic contact with the said hub.

The fusing of the blades 4 to the hub 1 involves first, positioning the hub 1 on the mandrel 3 which is attached to a rod 7 operatively piloted through a bearing 8 in either a purely axial or combined axial and rotational direction, the latter being required in case the blades have a spiral contact with the hub. Electric current of one polarity is introduced into the mandrel 3 and the hub 1 as, by way of example, through the aforementioned pilot bearing 8. In transferring the hub from position 1 to position 2, when the current is on, axial pressure is exerted on the rod 7 so as to forcibly ooze the excess material out of the contact surfaces.

The blades 4, of which there is at least a pair making up a fan, can be fused to the hub 1 individually in succession, or preferably with special advantages according to my invention, the whole number thereof can be conjoined to the hub simultaneously, thus completing the fan in one operation. The blade or blades 4 are disposed in their proper angular setting and in their ultimate radial relation to the hub 1, and firm mechanical hold thereon is provided in that position. For this purpose, a number of metallic clamps 5, arranged around the mandrel 3 are employed, one clamp for each blade. After the clamps 5 grip the blades 4 securely, electric current of a polarity opposite to that of the mandrel 3 is introduced into said blades, preferably through the clamps holding them, and fusion is readily accomplished as the mandrel 3 with the hub 1 thereon is operatively fed in between the roots of the blades 4. Due to the additional material 6 on the blades 4 the hub 1 will not fit into its ultimate position 2 until after fusing away of said amount 6.

It is obvious that the blades can be fused to the hub in any desired setting; they may, for instance, be parallel at their root with the axis of the hub, or they may be spirally twisted thereabout, as has already been mentioned in connection with the provision for feeding the hub into the blade assembly. The blades shown in the illustrations represent the case wherein they are parallel to the hub axis, this being the simplest positioning of all.

The blades 4, after being secured in the clamps 5, remain stationary with respect to each other and preferably with respect to the surroundings too, while the hub 1 alone executes the operation by virtue of its axial or combined axial and rotational movement.

It obviously cannot be interpreted as beyond the scope of this invention if instead of operatively moving the hub the reverse takes place, i. e., if the blades are brought in contact with a stationary hub; the latter procedure has been deemed mechanically more complicated and, therefore, less practical, than the former which has been consistently referred to in the foregoing description.

I claim:

1. The art of producing a fan, and the like comprising, forming a metallic hub with an axially tapering periphery contour, and a plurality of blades having a contour at the roots thereof corresponding to that of said hub, securing at least two of said blades in their proper relation to each other with said hub disposed centrally thereinbetween, and electrically fusing said hub with the roots of said blades while axially feeding same into the ultimate position thereof with respect to said blades; said hub and said blades constituting opposing polarities in said process of fusion.

2. The art of manufacturing a fan, and the like, comprising, forming a hub with a conoidal contour, and a plurality of blades having a root contour corresponding to that of said hub, securing said blades radially with respect to said hub and electrically fusing said hub thereto while wedging it axially thereinbetween.

3. The art of manufacturing a fan, and the like, comprising, forming a hub and a plurality of blades separately from each other with the parting line therebetween at an axial slant, and electrically welding said hub to said blades along said parting line while displacing said hub in substantially the axial direction thereof with respect to said blades.

4. The art of manufacturing a fan, and the like, comprising, forming a hub and a plurality of blades separately from each other with the parting line therebetween at an axial slant, and electrically welding said blades to said hub along said parting line while displacing said blades in substantially the axial direction of said hub with respect thereto.

5. The art of manufacturing a fan, and the like, comprising, producing a hub with a plurality of axially inclined abutting surfaces on its periphery, a plurality of blades having at their root extremity an excess stock as conforming to said abutting surfaces on said hub, and conjoining said hub to said blades by electrically melting said excess stock and displacing it by relative axial sliding movement of said hub and said blades.

6. The art of manufacturing a fan, and the like, comprising, producing a hub with a plurality of contact bases having a slope in one axial direction, a plurality of blades having at their root extremity an extension conforming to said contact bases on said hub, and conjoining said hub to said blades by electrically fusing said extension and displacing it by sliding said hub and said blades relatively along said contact bases into their ultimate axial and radial relative position.

In testimony whereof I affix my signature.

Signed in Wyandotte, in the county of Wayne and State of Michigan this 22nd day of August, 1928.

JAN PAVLECKA.